R. Gaylord,
Hollow Auger.

N° 39,284.    Patented July 21, 1863

Witnesses
J. W. Coombs
R. S. Spencer

Inventor:
Ransom Gaylord
per Munn & Co
attorneys

UNITED STATES PATENT OFFICE.

RANSOM GAYLORD, OF SEYMOUR, CONNECTICUT.

IMPROVEMENT IN HOLLOW AUGERS.

Specification forming part of Letters Patent No. 39,284, dated July 21, 1863; antedated April 26, 1862.

*To all whom it may concern:*

Be it known that I, RANSOM GAYLORD, of Seymour, in the county of New Haven and State of Connecticut, have invented a new and Improved Hollow Auger; and I do hereby declare that the following is a full, clear, and exact description of the same, reference being had to the accompanying drawings, forming part of this specification, in which—

Figure 1:
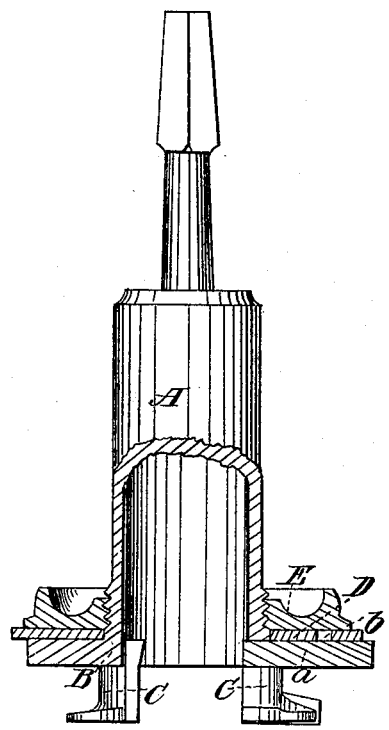
Figure 2:
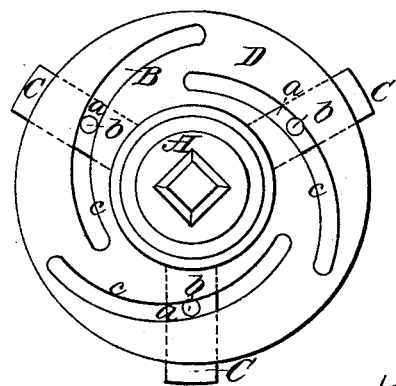

Figure 1 represents a vertical central section of this invention. Fig. 2 is a plan or top view of the same, the lock-nut having been removed to expose the slotted plate that forms the chief part of my invention.

Similar letters of reference in both views indicate corresponding parts.

To enable others skilled in the art to make and use my invention, I will proceed to describe its construction and operation with reference to the drawings.

The hollow shank A of the auger with the plate B, which forms the guide for the cutter-heads C, is constructed in the usual manner, said cutter-heads being provided with dove-tailed plates $a$, fitting into corresponding grooves in the guide-plate B. The cutter-heads are moved in and out by means of pins $b$, which project from their backs through eccentric slots $c$ in a disk, D, that is placed loosely over the shank of the auger, as clearly shown in Fig. 2 of the drawings. The slots $c$ are so arranged that they form arcs described with equal diameters from centers, which are situated on a circle described from the center of the disk D, and which divide said circle in three equal parts, and the grooves in the guide-plate B, which form the ways for the cutter-heads, are so situated that they radiate at angles of one hundred and twenty degrees, and that they divide the plate B into three equal parts. By this arrangement of the grooves in the guide-plate and the eccentric slots in the disk, and by the action of said eccentric slots on the pins $b$, projecting from the back of the cutter-heads, said cutter-heads are always kept at equal distances from the center of the auger, and by turning the disk D in one direction or in the other they are pushed out or drawn in simultaneously, and when the motion of the disk stops the cutter heads are arrested in a concentric position. A nut, E, which screws over the shank A of the auger holds the disk D down upon the backs of the cutter-heads, and prevents the pins $b$ coming out of the eccentric slots spontaneously, and at the same time, by screwing this nut down tight, the disk D together with the cutter-heads is firmly clamped and the cutter-heads are prevented changing their position during the operation of boring and against the will of the operator.

The construction of this auger is very simple. The slotted disk D can be cut out by means of a press or ready cast, and the whole device is so arranged that it cannot easily get out of order by the grease becoming thick or by the influence of the dust or shavings, or in any other manner.

Having thus fully described my invention, I claim as new, and desire to secure by Letters Patent, as an improved article of manufacture—

A hollow auger composed of a hollow-shank, A, grooved guide-plate B, cutter-heads C, with dovetailed plates $a$, pins $b$, eccentric slotted disk D, and nut E, as herein shown and described.

RANSOM GAYLORD.

Witnesses:
 CHARLES CRAFT,
 SYLVESTER GAYLORD.